United States Patent [19]

Woolpert

[11] 4,145,841
[45] Mar. 27, 1979

[54] EXTENDABLE PLANTER

[76] Inventor: John C. Woolpert, 753 Adobe Dr., Santa Rosa, Calif. 95405

[21] Appl. No.: 739,093

[22] Filed: Nov. 5, 1976

[51] Int. Cl.² ............................................. A01G 9/02
[52] U.S. Cl. .......................................... 47/66; 47/67; 47/71; 47/86
[58] Field of Search ................... 47/66, 67, 68, 69, 70, 47/71, 72, 73, 74, 75, 76, 77, 78, 79, 80, 81, 82, 83, 86

[56] References Cited

U.S. PATENT DOCUMENTS

| 265,098 | 9/1882 | Johnston | 47/66 |
|---|---|---|---|
| 964,196 | 7/1910 | Aul | 47/71 |
| 1,534,508 | 4/1925 | Earp-Thomas | 47/66 |
| 2,299,182 | 10/1942 | Schoof | 47/66 |
| 2,810,235 | 10/1957 | Magid | 47/71 |
| 2,900,759 | 8/1959 | Hutchinson | 47/66 |
| 3,183,624 | 5/1965 | Swett | 47/83 |
| 3,475,858 | 11/1969 | Flannigan | 47/66 |
| 3,631,627 | 1/1972 | Van Zijverden | 47/66 |
| 3,990,179 | 11/1976 | Johnson et al. | 47/67 |

FOREIGN PATENT DOCUMENTS

| 233181 | 3/1961 | Australia | 47/81 |
|---|---|---|---|
| 843326 | 7/1955 | Fed. Rep. of Germany | 47/66 |
| 11461 of | 1891 | United Kingdom | 47/79 |
| 399175 | 9/1933 | United Kingdom | 47/73 |

OTHER PUBLICATIONS

Anon. Crane Catalog No. 52, Pub. by Crane Co., May 1936, pp. 176,177,224,225,227,252,256,257,423,436,457.

*Primary Examiner*—Edgar S. Burr
*Assistant Examiner*—James R. Feyrer
*Attorney, Agent, or Firm*—James C. Wray

[57] ABSTRACT

An upper planter is expanded horizontally and vertically by connecting its large lower open end to an upper open end of a lower planter. A lower open end of a lower planter connects to a combination base and water tray. Screw threads attached to the planters and base cooperate to enable selective connecting and disconnecting. The shape of the continuous cavity formed within separate and connected planters provides room for the natural downward and outward extension of a growing plant root system.

31 Claims, 12 Drawing Figures

EXTENDABLE PLANTER

BACKGROUND OF THE INVENTION

This invention relates generally to planters and more particularly has reference to a planter apparatus comprising a plurality of planters used separately or interconnected to form a single, continuous downward and outward extending planter interior for retaining planting soil and the roots of a plant while facilitating the natural downward and outward expansion of a growing plant root system.

DESCRIPTION OF THE PRIOR ART

Interconnectable and expandable planters are shown in U.S. Pat. Nos. 2,893,167; 3,183,624; 3,374,574 and 3,683,549.

U.S. Pat. No. 2,893,167 shows a collapsible plant container having permanently connected sections mounted for relative sliding. U.S. Pat. Nos. 3,183,624 and 3,683,549 teach the connecting of separate planters to form a single planter device having a plurality of separate planting interiors. In U.S. Pat. No. 3,374,574 separate planters are stacked in supporting relation to form a single planter having a single planting interior continuous through the stacked planters and a plurality of separate peripheral planting areas.

U.S. Pat. No. 1,740,057 shows a planter formed of a unitary body having a relatively large lower end, a relatively small upper end, and a plurality of openings in a side wall.

One problem in the prior art devices lies in the repotting required to facilitate the natural downward and outward expansion of growing plant roots. Existing root systems are severly disturbed when transferred to new potting soil. Botanical shock from transplanting is a well-known phenomenon. In prior art expansible devices fresh soil must be added at the sides and top rather than at the bottom where it is required.

Another problem lies in the difficulty of getting the proper soil mixture to the bottom of the root system. Similarly, liquid fertilizers must be added at the top of the pot rather than at the area of new root growth at the bottom of the pot where the fine root hairs ingest the nutrients.

Still another problem is the lack of any convenient method of securely connecting extension units to planters without disturbing the existing plant root system. Furthermore, present available planters are capable of only limited varieties and degrees of expansion. Extended planters cannot be hung near windows or sunroofs when expanded; their utility is restricted. They cannot be easily hung near windows or sunroofs where plants thrive.

A further problem is the lack of selectively attachable and detachable water trays. The inability of the tray to vary in size with expansions of the planter detracts from the natural stability and beauty of the device for use as a permanent planter.

A still further problem is the tendency of excess dampness to build up causing mold, rot and plant drowning.

Yet another problem is the inability of the planters to be conveniently shipped and stored. Excess weight and unusual proportions make them clumsy and bulky.

SUMMARY OF THE INVENTION

The present invention overcomes many of the problems which exist in prior art devices. The present invention provides extendable planters that grow with the plant. Repotting is not necessary. New extension units are simply screwed on at the bottom of existing planters.

The amount of soil mixture is reduced as the new soil requirements are added only at the bottom, where it is required, rather than at the sides and top as in normal repotting practices.

The planters further provide for the natural extension of the root system, during the annual growing season, as new plant mix is added at the base of the existing pot without disturbing existing root system.

Prepackaged extensions insure the proper soil mixture for bottom root growth with the simplest twist-on application. A built-in water tray attaches at the extendable planter bottom. Water and air vents aid in the elimination of excess dampness that would cause build-up of mold, rot and plant drowning. Vents permit direct application of liquid fertilizers into the area of new root growth rather than at top of pot. The water tray attached at the bottom of the planter permits use of the planter as a hanging basket. An expanding planter base provides natural stability and beauty for use as a permanent planter.

The extendable planter of the present invention produces the healthiest root system which in turn results in greener foliage, stronger plants and luxurious flowers that promise longer life.

Small, separate unit heights provide a wide range of sizes for varying planting requirements. Empty planters are conveniently stored in crowded areas as the units telescope together.

Light in weight with tapered side walls, the planter of the present invention minimizes shipping, handling and storage costs.

The planter is satisfactory for quantity use in nursery and agricultural programs to satisfy the demands of a growing plant and expanding root system in nature's way.

The planters can be made of nonporous material to eliminate the unsightly effect of water stains often appearing on conventional pots and planters.

In a preferred form, the present invention expands an upper planter unit horizontally and vertically by connecting its lower open end to the upper open end of a lower planter unit. The preferred means of attaching the lower unit to the upper unit is by screwing the two units together with the threaded base of the upper unit screwing into the threaded top of the lower unit. Each unit has a threaded inner flange at the upper end of a side wall, a trough formed by two flanges at top of the unit, vents at the bottom of the trough and the side wall, and a threaded bead at the lower end of the unit for connection to the threaded inner flange of the next lower unit, and a ring collar for reverse attachment or of a lower unit to an upper unit and a water tray.

In one embodiment of the invention, the side walls of the units are conical with flat upper and lower open ends. The lower open end of the bottom unit is connected to a circular base and water tray.

In another embodiment of the invention, the side walls of the units have rectangular horizontal cross sections and flat upper and lower open ends. The lower open end of the bottom unit is connected to a rectangular base and water tray. This "Pagoda Pot" design will be attractive to the Oriental market. Preferably, the concept of screwing on a new unit is continued in this embodiment by means of a circular opening at the base of the water tray having a standing wall threaded to receive the unit below. The opening is sealed with a cap that screws onto the threaded standing wall when the unit below is not attached.

The means of attachment of the side walls of the units to base and water tray units is by attaching a toe at the base of the side wall which will snap under a projection attached to the water tray. The projection is preferably on only two opposing sides of the tray for hand pressuring the upper unit on and off the tray as desired.

In another embodiment of the invention, means are provided for horizontal extension of the planter. Preferably, the extension is achieved by use of a unit appearing as a spoked wheel designed to screw to either the upper or lower end of a smaller unit of circular form. The smaller unit fits into a hub on the spoked wheel unit with the small perimeter fitting inside, and larger perimeter fitting outside of the hub. A rim standing at the center of the hub is threaded both inside and outside for receiving either the threaded top or threaded bottom of an adjoining unit.

Preferably, openings are created between "spokes" to provide small planting areas at the side of the planter as the planter is extended horizontally.

In another embodiment of the invention, an in-out-in side wall pattern is achieved by using reinforcing threaded rings as connectors for side wall units of the same size. This design feature enables pot extensions in the larger units, to extend down only, without lateral extension. The connector rings have inside threads to receive the threaded base of a unit side wall.

In a further embodiment of the invention, the extendable planter reuses the same tray with the extension units adding only a downward fashion. A slight side wall taper facilitates compact storage of units. Preferably, the in-out-in pattern is made possible by the use of two connector rings; a larger ring with inside threads, and a smaller ring with threads on the outside of the ring. Both ring sizes appear on a standing inside rim of a connecting water tray.

In preferred form, the water tray or base unit is designed to permit proper drainage of the planter as the planter is not permitted to screw all the way to the base, thus leaving vents open at the base of the threaded standing rim on the water tray.

OBJECTS OF THE INVENTION

One object of this invention is the provision of an extendable planter having a first plant-holding section for holding roots of a plant, the first plant-holding section having upper and lower open ends, lower joining threads connected to the first plant-holding section adjacent the lower open end for joining the lower end to a second plant-holding section, a second plant-holding section for holding roots of a plant, the second plant-holding section having an open upper end and a lower end, upper joining threads connected to the second plant-holding section adjacent the upper open end for cooperating with the lower joining threads to enable selective connecting and disconnecting of the first and second plant-holding sections, the open ends of the first and second plant-holding sections providing a continuous cavity through the first and second plant-holding sections when connected to accommodate the roots of a single plant.

A further object of the invention is the provision of extendable planter apparatus having upper and lower similar shaped plant holders having open tops and downward and outward sloping side walls, the upper holder having an open lower end of a size corresponding to the upper end of the lower holder, an interconnection for interconnecting the open lower end and the upper end of the second holder and a closure for closing a lower end of the lower holder.

These and other and further objects and features of this invention are apparent in the disclosure which includes the above and below specification and claims and drawings.

DETAILED DESCRIPTION OF THE DRAWINGS

Figure 1:
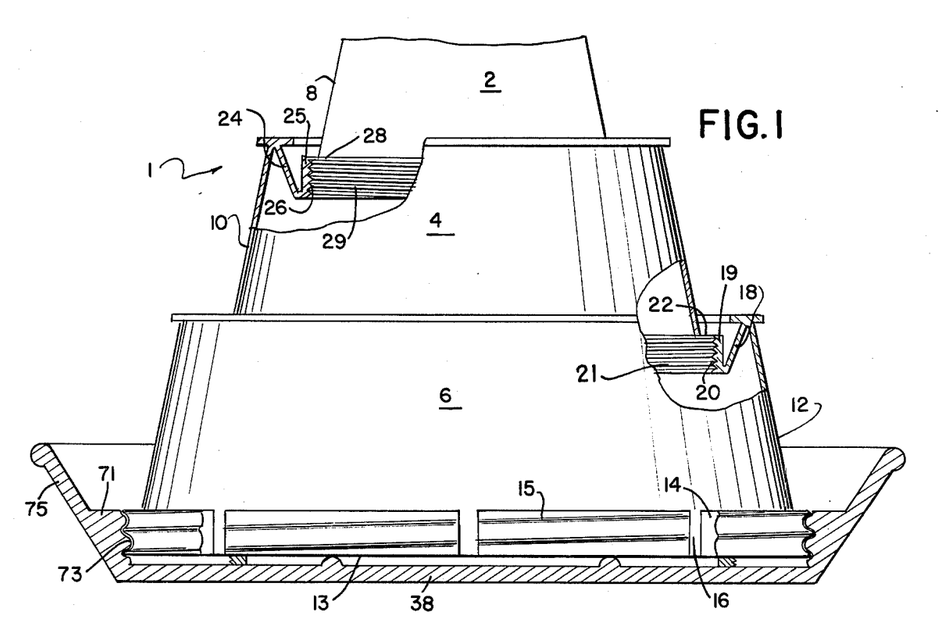
FIG. 1 is a side elevation, partly in section, of a planter embodying the principles of the present invention.

Referring to FIG. 1, the preferred embodiment of an extendable planter incorporating the features of the present invention is generally indicated by the numeral 1. The planter 1 has plant soil holding sections 2, 4 and 6 interconnected to form a single planter apparatus with a continuous inner cavity for holding a continuous core of soil. Each of the sections 2, 4 and 6 comprises a conical side wall 8, 10 and 12 formed about a vertical axis and has upper and lower open ends. The lower ends have larger radial dimensions than the upper ends to facilitate the natural downward and outward expansion of a growing plant root system.

The lower section 6 has an inwardly and downwardly flaring annular flange 18 connected to its upper rim. The flange 18 terminates inwardly in a vertical flange 19 having a threaded inward surface 20 configured to matingly receive the threaded outward surface 21 of an annular bead 22 connected to the lower end of the medial section 4. The lower and medial sections 4 and 6 are selectively connected by screwing the threaded surface 21 of the annular bead 22 into the threaded surface 20 of the vertical flange 19. Unscrewing the surfaces 20 and 21 disconnects the sections 4 and 6.

Preferably, the planter sections are substantially identical but for variations in radial scale. An annular bead 14 having a threaded outward surface 15 and an annular flange 24 terminating inwardly in a vertical flange 25 having a threaded inward surface 26 connected to the lower and medial sections 6 and 4 respectively enable the lower and upper ends respectively of those sections 6 and 4 to be connected to additional planter elements. It is appreciated that the planter 1 can be further extended vertically by adding any number of additional similar planter sections. Preferably, the sections widen downwardly in a continuous manner. Consequently, the lower end of the upper section 2 is provided with an annuler bead 28 having a threaded outward surface 29 and the upper end of the upper section 2 is provided with flanges (not shown) similar to the flanges 18, 19 24 and 25 on the medial and lower sections 4 and 6.

Figure 2:
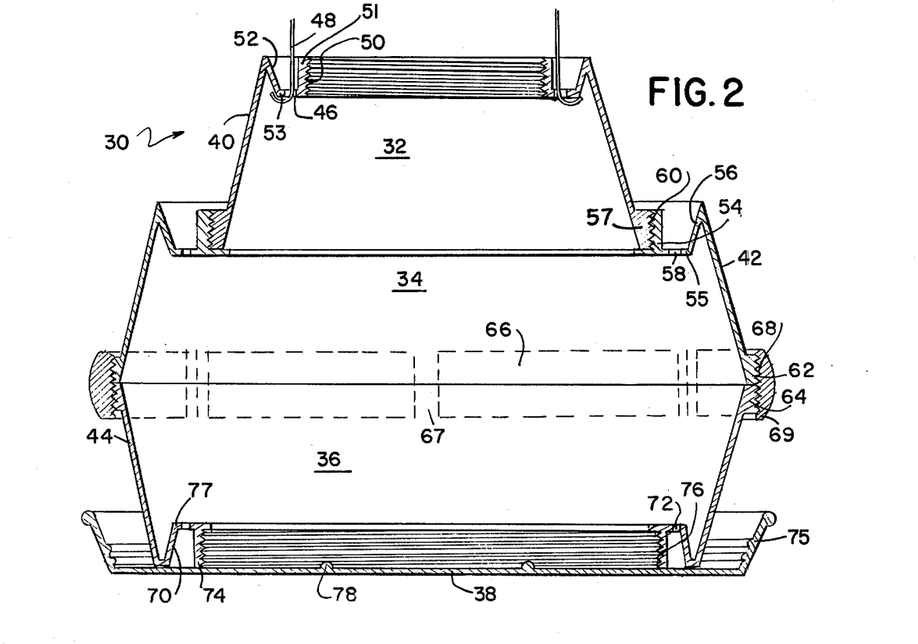
FIG. 2 is a side elevation sectional view of another planter embodying the principles of the present invention.

Spaced slots 16 provided in the annular beads 14, 22 and 28 enable the ends of a planter suspending hanger (not shown) similar to the hanger 48 in FIG. 2 to selectively engage the lower rims of the sections 2, 4 and 6 when the sections 2, 4 and 6 are connected.

In actual use, the extendable planter 1 has a base and water tray 75 connected to the lower open end of the bottom section shown as lower section 6 in FIG. 1. It is appreciated that when the lower section 6 is disconnected from the medial section 4, a similar base and water tray may be connected to the lower end of the medial section 4, thereby forming two complete planters, one composed of the lower section 6 with a base and water tray 75, another composed of the upper and medial sections 2 and 4 with a base and water tray. Any number of similar bases can be connected to further planter sections whose lower ends are disconnected from adjacent planter sections to form any number of desired planter units. In the configuration shown in FIG. 1, the threaded inward surface 73 of an annular vertical wall 71 connected about the periphery of a flat bottom portion 38 of the base 75 receives the threaded surface 15 of the annular bead 14 connected to the lower section 6. Projections 78 on the upper surface of the flat portion 38 of the base 75 contact and space the lower rim 13 of the lower section 6 a distance above the flat portion 38 to enable excess water placed in the planter 1 to escape into and be contained by the base and water tray 75.

In preferred practice, initially the upper section 2 is used alone with a base and water tray connected to the threaded bead 28 on its lower end. Soil and plant roots would then be placed into the upper section 2. If desired, the planter can be suspended by connecting it to the ends of a hanger in the manner already described. As the plant grows, the roots naturally expand outward and downward facilitated by the shape of the upper section 2. To accommodate further growth, a base and water tray is connected to the annular bead 22 of the medial section 4. Planting soil is then placed into the medial section 4. The base and water tray is then removed from the upper section 2 and the threaded annular bead 28 on the upper section 2 is screwed into the threaded surface 26 of the vertical flange 25 on the upper end of the soil-filled medial section 4. A similar procedure is repeated with the medial and lower sections 4 and 6 to further expand the planter and accommodate additional growth. Any number of such expansions can be accomplished by adding additional similar planter sections in the same manner.

FIG. 2 shows a second embodiment of the invention comprising plant holding sections 32, 34 and 36, base and water tray 75 and connecting ring collar 69. The plant-holding sections 32, 34 and 36 comprise conical side walls 40, 42 and 44 formed about vertical axes and have upper and lower open ends. The lower ends of the upper and medial sections 32 and 34 have larger radial dimensions than the upper ends to facilitate the natural downward and outward expansion of a growing plant root system. The lower end of the lower section 36 has smaller radial dimensions than the upper end to provide decorative variation in planter contour and increased water tray holding capacity. The base and water tray 75 is substantially as described with reference to FIG. 1.

Downwardly and inwardly flaring annular flanges 52 and 56 are connected to the upper rims of the upper and medial planter sections 32 and 34. Vertical flanges 51 and 54 having threaded inward surfaces 50 and 60 are connected to the ends of the downwardly and inwardly flaring flanges 52 and 56 by annular troughs 53 and 55. Mirror image flanges 70 and 74 and troughs 77 are connected to the lower end of the lower section 36. The annular troughs 53, 55 and 77 are provided with small openings 46, 58 and 72 which permit the ends of hangers 48 to be selectively connected to the flanges 52 and 56 when the plant-holding sections 32, 34 and 36 and the base and water tray 75 are connected.

Annular beads 57, 62 and 64 with threaded outward surfaces are connected to the lower ends of the upper and medial sections 32 and 34 and to the upper end of the lower section 36. In a manner similar to the embodiment shown in FIG. 1, the threaded beads on the upper sections are configured to be selectively screwed and unscrewed into the threaded inward surfaces at the upper ends of adjacent medial sections. This configuration is illustrated in FIG. 2 by the connection between the bead 57 on the upper section 32 and the threaded flange surface 60 on the upper end of the medial section 34. The upper section 32 is substantially a reproduction of the medial section 34 on a smaller radial scale. However, the lower section 36 is substantially a mirror image of the medial section 34.

Figure 10:
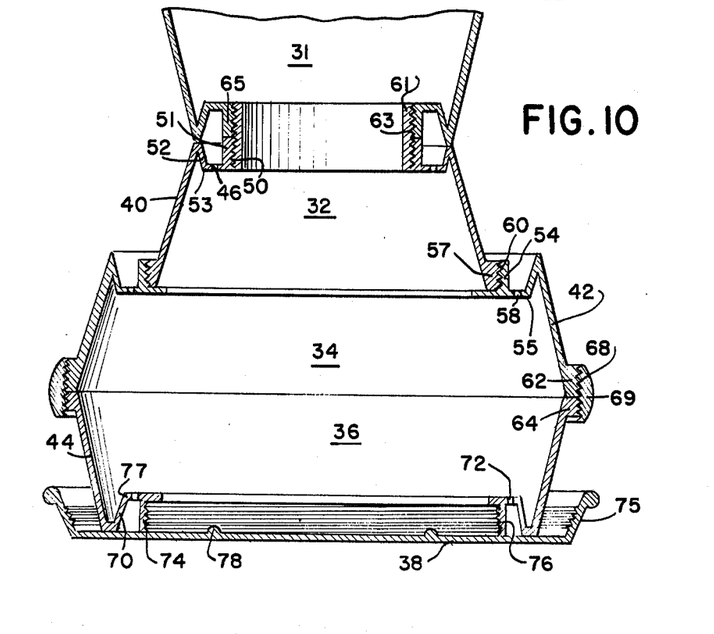
FIG. 10 is a side elevation sectional view of another planter embodying the principles of the present invention.

The lower end of the medial section 34 is connected to the upper end of the lower section 36, by screwing the beads 62 and 64 on those sections into an annular ring collar 69 having a threaded inward surface 68. Projections 67 on the outer surface of the collar 69 act as collar reinforcements and finger grips which facilitate rotation of the collar 69 for screwing and unscrewing the collar 69 onto the beads 62 and 64. An alternative to the threaded collar 69 is shown in FIG. 10 and comprises an annular ring lining 61 having a threaded outward surface 63 used to connect threaded inward surfaces of adjacent section flanges 51 and 65.

The base and water tray 75 has a vertical annular wall 76 connected to the flat portion 38 of the base 75 provided with an outward surface threaded for cooperation with the threaded vertical flange 74 on the lower end of the lower section 36 to enable selective connection and disconnection of the lower section 36 and the base and water tray 75. When the lower section 36, the tray 75 and the ring collar 69 are disconnected from the medial section 34, the threaded bead 62 on the lower end of the medial section 34 is screwed into the threaded inward surface 73 of the vertical wall 71 on the base 75 in a manner similar to the lower section 6 and base 75 shown in FIG. 1.

Figures 2A, 5:
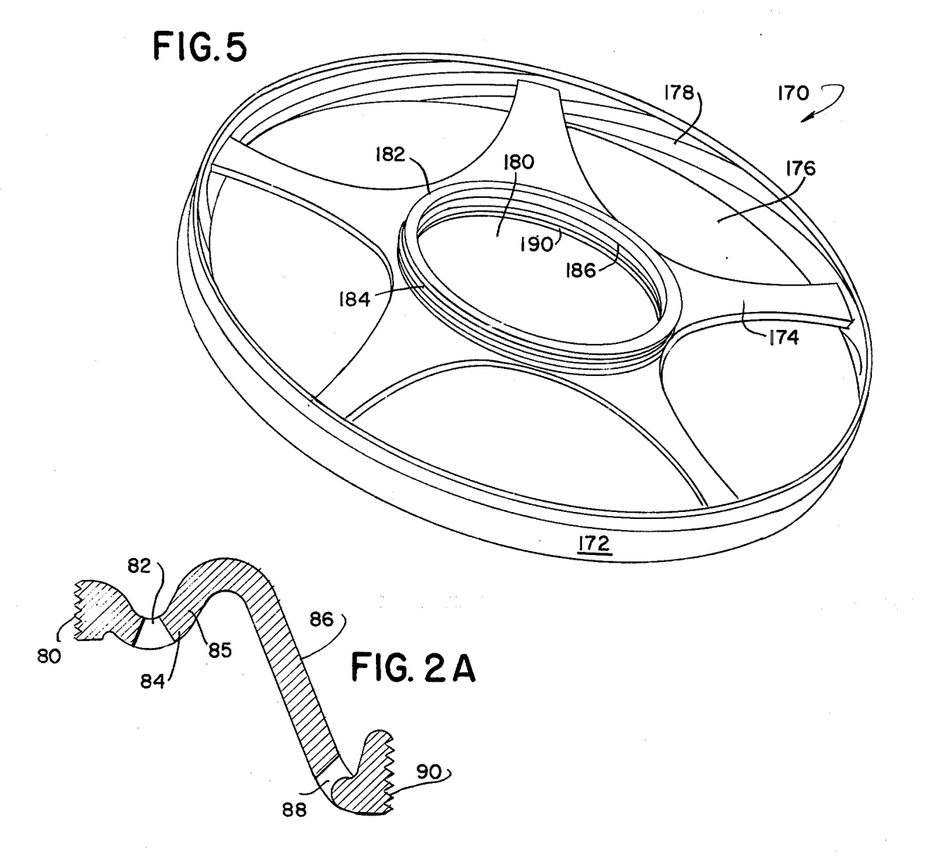
FIG. 2A is a sectional detail view of a variation of a portion of the side wall and upper and lower joining means shown in FIG. 2.
FIG. 5 is a perspective view of a horizontal extension means.

FIG. 2A shows an alternative hanger opening arrangement used with planter sections similar to those shown in FIG. 2. Spaced openings 88 are provided in the side walls of the sections adjacent the annular beads 90. Openings 82 are also provided in the troughs 84 connecting the inwardly flaring flanges 85 and the threaded vertical flanges 80.

Figure 3:
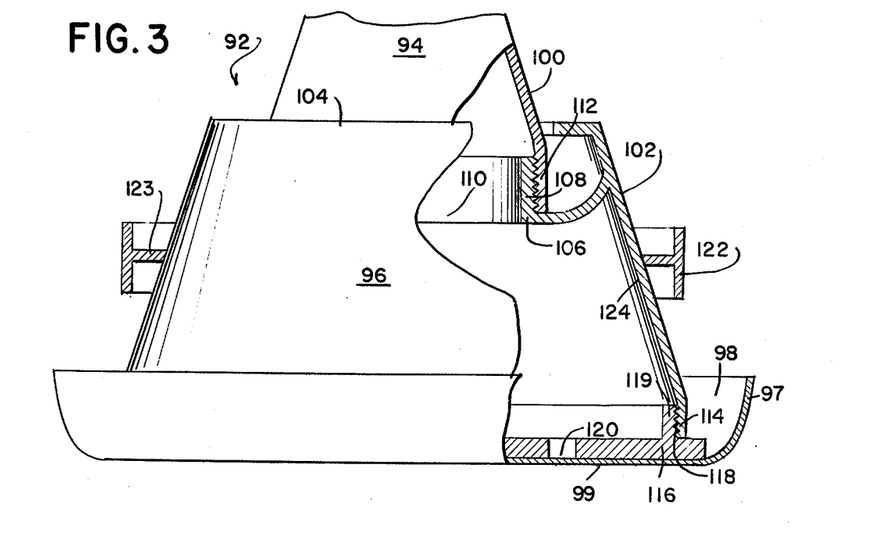
FIG 3 is a side elevation, partly in section, of another planter embodying the principles of the present invention.

FIG. 3 shows another embodiment of the present invention. An annular shelf 106 is connected to the inner surface 124 of the lower planter section 96 adjacent the upper end. A vertical flange 108 having a threaded outward surface is connected to the inward end of the shelf 106. The shelf 106 and the flange 108 are both provided with spaced hanger openings 110. The threaded surface of the flange 108 is selectively screwed and unscrewed to the threaded inward surface of a side wall extension 112 connected to the lower end of the side wall 100 of the upper section 94.

The base and water tray 98 has a flat bottom surface 99 connected to an annular ridge 116 positioned inwardly of the outer side walls 97 of the tray 98. A vertical wall 119 connected to the upper surface of the annular ridge 116 has a threaded outer surface 118 configured for cooperation with the threaded inward surface of the side wall extension 114 connected to the lower section 96 to enable selective connection and disconnection of the lower section 96 and the base and water tray 98. The annular ridge 116 is provided with spaced openings 120 which allow water contained by the tray 98 to flow across the flat bottom 99 of the tray 98 to the outer side walls 97 of the tray 98.

A decorative ring 122 has a standing seam 123 resting on the side wall 102 of the lower section 96 to add stylistic variation to the outer contour of the planter 92.

Figure 4:
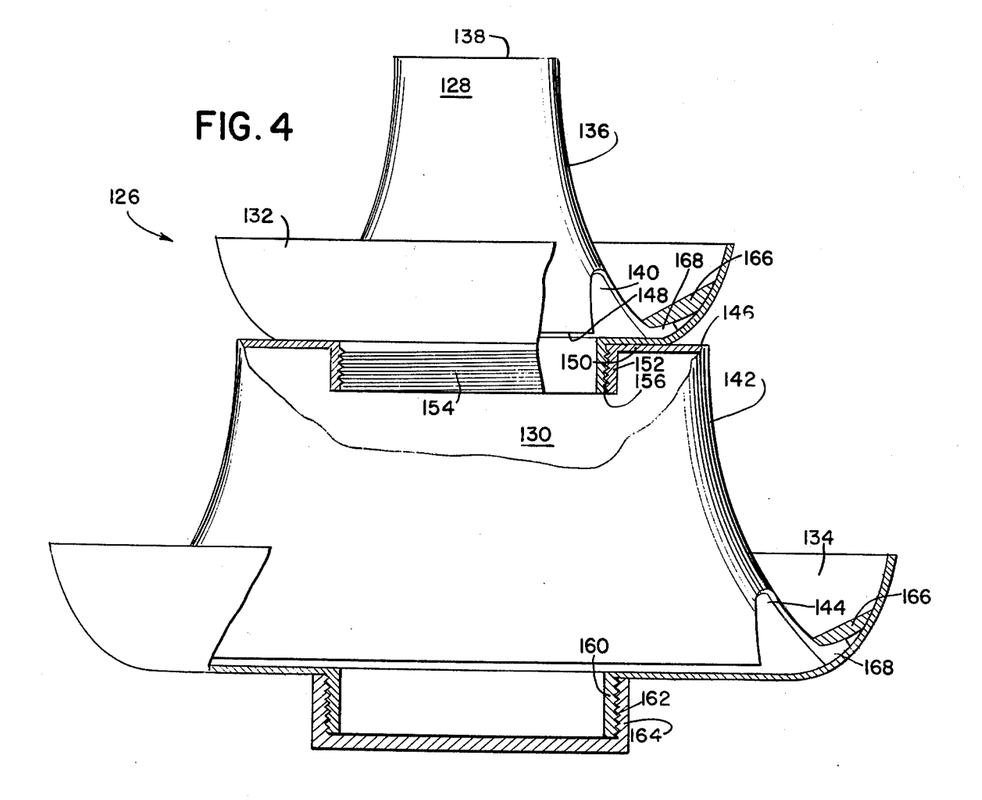
FIG. 4 is a side elevation, partly in section, of another embodiment of the present invention.
Figure 4A:
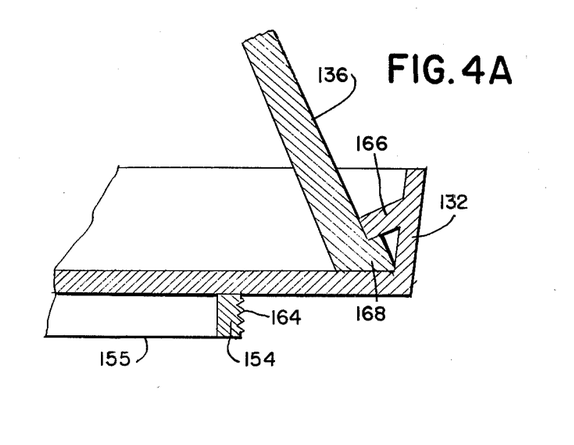
FIG. 4A is a sectional detail of the uniting means shown in FIG. 4.

A pagoda style embodiment of the present invention is shown in FIG. 4. The planter sections 128 and 130 comprise continuous side walls 136 and 142 formed about vertical axes and have open upper and lower ends. The planter sections are connected to trays 132 and 134 by outwardly extending flanges 168 connected to the lower ends of the side walls 136 and 142. As shown in FIG. 4A, the flanges 168 are vertically aligned with and downwardly pressured by flanges 166 on the inner surfaces of the outer side walls of the trays 132 and 134. Finger pressure on the side walls 136 and 142 releases the flanges 168 on the side walls 136 and 142 from beneath the flanges 166 on the trays 132 and 134 thereby allowing the sections 128 and 130 to be detached from the trays 132 and 134.

Vertical annular walls 154 and 160 having threaded outer surfaces 156 and 162 are connected to the trays 132 and 134 about openings in the trays aligned with the lower open ends of the planter sections 128 and 130. A flat plug plate 150 is frictionally engaged to the open upper end of the lower section 130 by means of vertical flanges (not shown) connected about the periphery of the plug plate 150. A vertical annular wall 152 having a threaded inner surface is connected to the plug plate 150 about an opening aligned with the opening in the tray 132 connected to the upper section 128. The threaded surfaces of the vertical plug wall 152 and the vertical tray wall 154 cooperate to enable selective connecting and disconnecting of tray 132 and plug plate 150. A cap 164 having a vertical wall with a threaded inner surface is screwed onto the threaded surface 164 of the vertical wall 160 connected to the tray 134 to cover the opening in the tray 134 and serve as a base for the entire planter unit 126.

Openings 140 and 144 in the side walls 136 and 142 of the planter sections 128 and 130 allow excess water placed in the sections 128 and 130 to escape into the trays 132 and 134.

Figure 6:
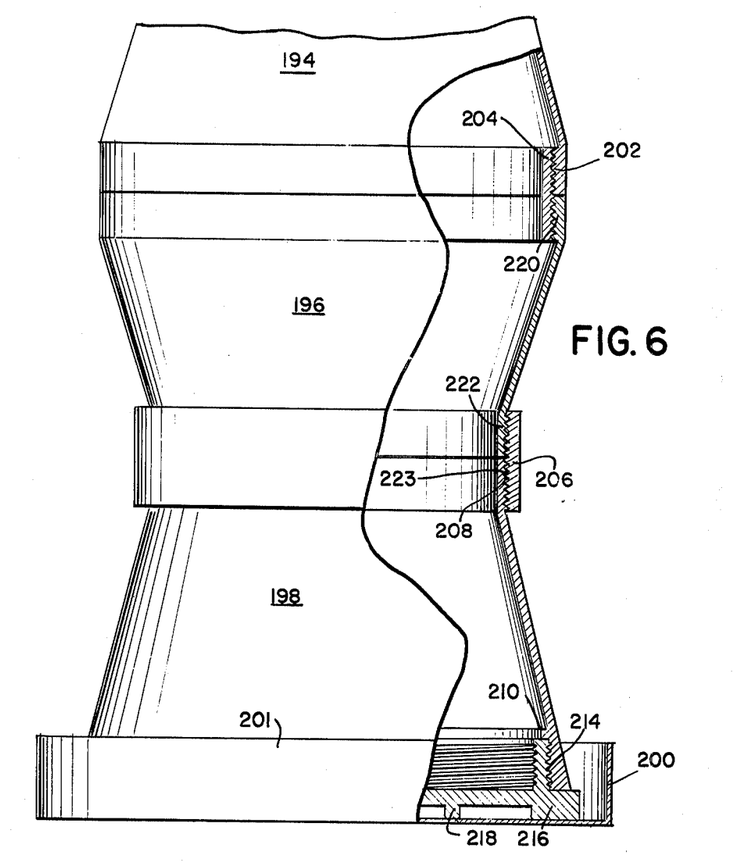
FIG. 6 is a side elevation, partly in section, of another embodiment of the present invention.
Figure 7:
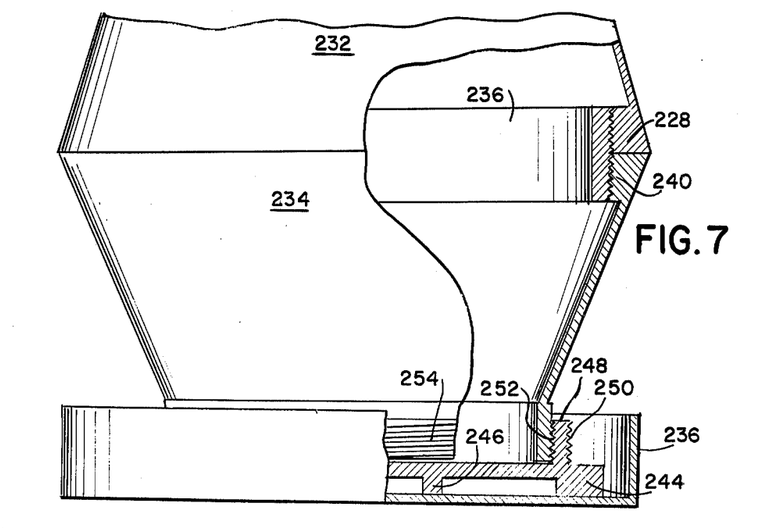
FIG. 7 is a side elevation, partly in section, of another embodiment of the present invention.
Figure 8:
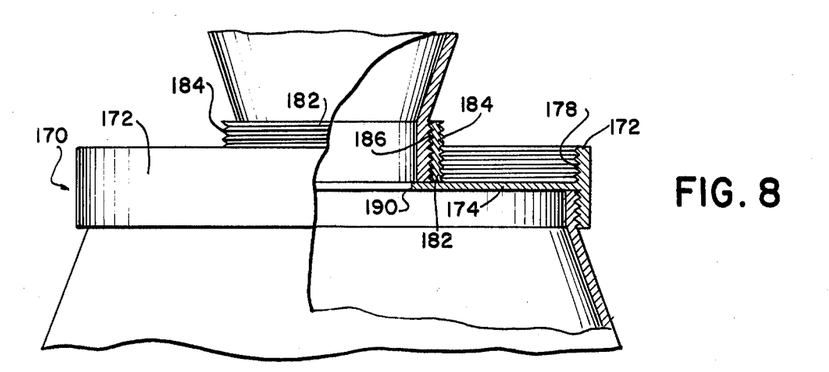
FIG. 8 is a side elevation, partly in section, of a planter embodying the horizontal extension means.
Figure 9:
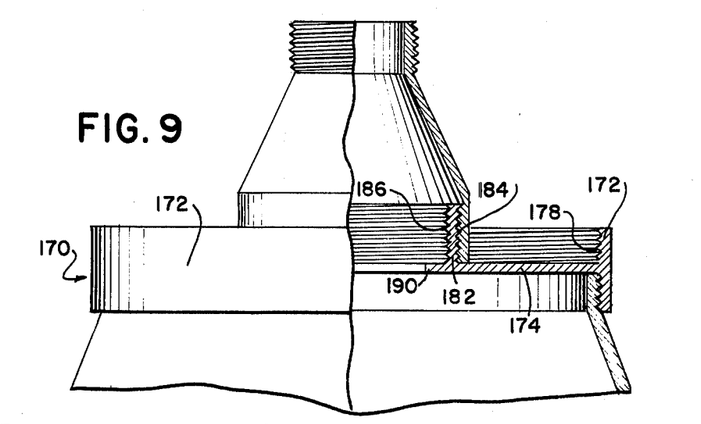
FIG. 9 is a side elevation, partly in section, of a second planter embodying the horizontal extension means.

FIG. 5 shows a horizontal extension coupling 170 for use with planter sections having circular horizontal cross section thread attachments similar to those in FIGS. 6 and 7. The vertical circular wall 182 has an outer threaded surface 184 and an inner threaded surface 186. A flat annular lip 190 is connected to the lower end of the wall 182 to form a circular opening 180 in the center of the extension coupling 170. Horizontal extension arms 174 have inward ends connected in spaced relation about the lower end of the wall 182 and outward ends connected to an outer annular member 172 having a threaded inner surface 178. The threaded surfaces 184 and 186 on the vertical wall 182 are configured to cooperate with threaded surfaces on planter sections similar to those in FIGS. 6 and 7 to enable selective connecting and disconnecting of the sections and the horizontal extension coupling 170. The threaded surface 178 is configured to selectively receive threaded surfaces on planter sections similar to those in FIGS. 6 and 7 but having radial dimensions greater than the radial dimensions of the planter sections connected to the wall 182. Openings 176 between the extension arms 174 expose side planting areas in the planter section connected to the annular member 172. FIGS. 8 and 9 show the horizontal extender 170 used to connect planter sections in the manner described.

FIGS. 6 and 7 show two additional embodiments of the present invention wherein connector rings are used to extend planters vertically without simultaneously extending them horizontally. The planter sections 194, 196, 198, 232 and 234 have side wall extensions 202, 220, 225 and 228 and 240 with threaded inward surfaces and sidewall extensions 222, 223 and 254 with threaded outward surfaces. A connector ring collar 206 has a threaded inner surface 208 which selectively receives the threaded outer surfaces of the side wall extensions 222 and 223 of adjacent planter sections 196 and 198 to joing the sections 196 and 198. Connector ring linings 204 and 236 have threaded outer surfaces selectively received by the threaded inner surfaces of the side wall extensions 202, 220 and 238 and 240 of adjacent planter sections 194, 196, 232 and 234 to join the sections 194 and 196 and 232 and 234.

The base and water tray 200 shown in FIGS. 6 and 7 is substantially similar to the base and water tray 98 shown in FIG. 3 but includes screw threads 212 on the inner surface of the vertical wall 210 connected to the tray 200 in addition to screw threads 214 on the outer surface of the wall 210 to enable the tray to be selectively connected to the inwardly threaded side wall extensions 225 as shown in FIG. 6 or the outwardly threaded side wall extensions 254 as shown in FIG. 7.

While the invention has been described with reference to a specific embodiment, the exact nature and scope of the invention is defined in the following claims.

What I claim is:

1. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and further comprising a decorator means connected to the plant-holding means for varying the outer contour of the plant-holding means, the decorator means comprising an annular member having a radially inward surface, a standing seam projecting inwardly from the radially inward surface and terminating inwardly on an outer side wall of the plant-holding means to support the annular member on the plant-holding means.

2. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly tapering cavity terminating at upper and lower open ends of the second plant-holding means, upper joining means connected to the second plant-holding means adjacent the upper open end for joining the upper end to the first plant-holding means, interconnecting means connected to the upper and lower joining means for selectively joining the first and second plant-holding means, second lower joining means connected to the second plant-holding means adjacent the lower open end for joining the lower end to base means, base means having base joining means for cooperating with the second lower joining means to enable selective joining of the second plant-holding means and the base means, and second base joining means connected to the base means for cooperating with the lower joining means connected to the first plant-holding means to enable selective joining of the first plant-holding means and the base means when the second plant-holding means and interconnecting means are disconnected from the first plant-holding means and the first plant-holding base means.

3. The extendable planter apparatus of claim 2 wherein the second lower joining means comprises an upwardly and inwardly flaring annular flange connected to the rim of the lower end of the second plant-holding means terminating upwardly in an inward horizontal flange, a vertical flange connected to the inward end of the horizontal flange having a threaded radially inward surface, the base means comprises a flat bottom portion with radial dimensions greater than the radial dimensions of the second lower joining means, and a substantially upwardly extending outer sidewall connected about the periphery of the flat bottom portion, the base joining means comprises a vertical annular wall connected to the upper surface of the flat bottom portion inwardly of the outer wall having a threaded radially outward surface configured for cooperation with the threaded surface on the second lower joining means to enable selective joining of the second plant-holding means and the base means, and the second base-joining means comprises a threaded radially inward surface on the upwardly extending outer sidewall configured for cooperation with a threaded surface on the lower joining means connected to the first plant-holding means, the lower joining means comprising an annular bead connected to the first plant-holding means adjacent the lower end having a threaded radially outward surface.

4. The extendable planter apparatus of claim 3 further comprising upwardly extending projections on the upper surface of the flat bottom portion of the base means vertically aligned with and contacting the lower rim of the plant-holding means connected to the base means for spacing the lower rim of the plant-holding means a distance above the upper surface of the flat bottom portion of the base means to enable excess water placed in the plant-holding means to escape into and be contained by the base means.

5. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and wherein the upper joining means comprises an inwardly and downwardly flaring annular flange connected to the rim of the upper end of the second plant-holding means and terminating inwardly in a vertical flange having a threaded radially inward surface, and the lower joining means comprises an annular bead connected to the first plant-holding means adjacent the lower end having a threaded radially outward surface configured to matingly engage the threaded surface of the upper joining means to enable selective connecting and disconnecting of the first and second plant-holding means.

6. The extendable planter apparatus of claim 5 wherein the lower joining means and the upper joining means comprise cooperating screw thread surfaces radially spaced from the sidewalls of the first and second plant-holding means respectively.

7. The extendable planter apparatus of claim 5 wherein the radial dimensions of every horizontal cross section of the second plant-holding means are greater than the radial dimensions of every horizontal cross section of the first plant-holding means thereby forming a continuous cavity through the first and second plant-holding means when connected having increasing radial dimensions in the downward direction to accommodate the expanding root structure of a growing plant.

8. The extendable planter apparatus of claim 5 wherein the sidewalls of the first and second plant-holding means comprise conical side walls formed about vertical axes with flat upper and lower ends.

9. The extendable planter apparatus of claim 5 wherein the annular threaded bead is provided with spaced slots to enable the end of a hanger to selectively engage the lower rim of the first plant-holding means when the first and second plant-holding means are connected.

10. The extendable planter apparatus of claim 5 further comprising an opening in the lower end of the second plant-holding means, second lower joining means connected to the second plant-holding means adjacent the open lower end for joining the lower end of the second plant-holding means to base means, base means having base joining means for cooperating with the second lower joining means to enable selective connecting and disconnecting of the second plant-holding means and the base means.

11. An extendable planter apparatus comprising first plant-holding means for holding roots of a plant, the first plant-holding means having sidewalls defining an interior downwardly tapering cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for joining the upper end to the first plant-holding means, interconnecting means connected to the upper and lower joining means for selectively joining the first and second plant-holding means, wherein the lower joining means comprises a sidewall extension connected to the sidewall of the first plant-holding means adjacent the lower end having a threaded outer surface, the upper joining means comprises a sidewall extension connected to the sidewall of the second plant-holding means adjacent the upper end having a threaded outer surface, and the interconnecting means comprises an annular ring collar having a threaded radially inward surface configured for cooperation with the threaded surface on the sidewall extensions of the first and second plant-holding means to enable selective connecting and disconnecting of the annular ring collar and the first and second plant-holding means.

12. An extendable planter apparatus comprising first plant-holding means for holding roots of a plant, the first plant-holding means having upper and lower open ends, lower joining means connected to the first plant-holding means adjacent the lower open end for joining the lower end to second plant-holding means, second plant-holding means for holding roots of a plant, the second plant-holding means having an open upper end and a lower end, upper joining means connected to the second plant-holding means adjacent the upper open end for cooperation with the lower joining means to enable selective connecting and disconnecting of the first and second plant-holding means, the open ends of the first and second plant-holding means providing a continuous cavity through the first and second plant-holding means when connected to accommodate the roots of a single plant, and wherein the first plant-holding means comprises a continuous side wall formed about a vertical axis, the lower joining means comprises a first side wall extension connected to the lower end of the side wall of the first plant-holding means having a threaded inner surface, an annular ring having a threaded radially outward surface configured for cooperation with the threaded surface on the first side wall extension to enable selective connecting and disconnecting of the annular ring and the first plant-holding means, side extension arms having inward ends connected in spaced relationship about the annular ring and outward ends configured for connection to an annular member, and an annular member connected to the outward ends of the side extension arms and configured for cooperation with the upper joining means to enable selective connecting and disconnecting of the annular member.

13. The extendable planter apparatus of claim 12 further comprising a second side wall extension connected to the first plant-holding means opposite the first side wall extension having a threaded outer surface, the annular ring further having a threaded radially inward surface configured for cooperation with the threaded surface on the second side wall extension to enable selective connecting and disconnecting of the annular ring to opposite ends of the first plant-holding means.

14. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly tapering cavity terminating at an open upper end and a lower end of the second plant-holding means, upper joining means connected to the second plant-holding means adjacent the upper open end for joining the upper end to the first plant-holding means, interconnecting means connected to the upper and lower joining means for selectively joining the first and second plant-holding means, wherein the lower joining means comprises a sidewall extension connected to the sidewall of the first plant-holding means adjacent the lower end having a threaded inner surface, the upper joining means comprises a sidewall extension connected to the sidewall of the second plant-holding means adjacent the upper end having a threaded inner surface, and the interconnecting means comprises an annular ring lining having a threaded radially outward surface configured for cooperation with the threaded surface on the sidewall extensions of the first and second plant-holding means to enable selective connecting and disconnecting of the annular ring lining and the first and second plant-holding means.

15. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly tapering cavity terminating at an open upper end and a lower end of the second plant-holding means, upper joining means connected to the second plant-holding means adjacent the upper open end for joining the upper end to the first plant-holding means, interconnecting means connected to the upper and lower joining means for selectively joining the first and second plant-holding means, wherein the lower joining means comprises a first annular bead connected to the first plant-holding means adjacent the lower end having a threaded radially outward surface, the upper joining means comprises a second annular bead connected to the second plant-holding means adjacent the upper end having a threaded radially outward surface, the interconnecting means comprises an annular ring collar having a threaded radially inward surface configured for cooperation with the threaded surfaces on the first and second annular beads to enable selective connecting and disconnecting of the annular ring collar and the first and second plant-holding means.

16. The extendable planter apparatus of claim 15 further comprising vertically aligned reinforcing projections on a radially outward surface of the annular ring collar to increase ring collar strength and provide finger grips for facilitating connecting and disconnecting of the ring collar and the first and second plant-holding means.

17. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and wherein the upper joining means comprises a downwardly and inwardly flaring annular flange connected to the rim of the upper end of the second plant-holding means terminating downwardly in an inward horizontal flange, a vertical flange connected to the inward end of the horizontal flange forming an annular trough between the vertical and downwardly and inwardly flaring flanges, the vertical flange having a threaded radially inward surface, and the lower joining means comprises an annular bead connected to the first plant-holding means adjacent the lower end having a threaded radially outward surface configured for cooperation with the threaded surface on the upper joining means to enable selective connecting and disconnecting of the first and second plant-holding means.

18. The extendable planter apparatus of claim 17 wherein the horizontal flange is provided with spaced openings to enable selective connecting and disconnecting of the end of a hanger to the outer surface of the downwardly and inwardly flaring flange when the first and second plant-holding means are connected.

19. The extendable planter apparatus of claim 17 wherein the sidewall of the first plant-holding means is provided with spaced openings adjacent the annular bead to enable selective connecting and disconnecting of the end of a hanger to the lower rim of the first plant-holding means when the first and second plant-holding means are connected.

20. An extendable planter apparatus comprising first plant-holding means for holding roots of a plant, the first plant-holding means having sidewalls defining an interior downwardly tapering cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for joining the upper end to the first plant-holding means, interconnecting means connected to the upper and lower joining means for selectively joining the first and second plant-holding means, wherein the lower joining means comprises an upwardly and inwardly flaring annular flange connected to the rim of the lower end of the first plant-holding means and terminating upwardly in an inward horizontal flange, a vertical flange connected to the inward end of the horizontal flange having a threaded radially inward surface, the upper joining means comprises a downwardly and inwardly flaring annular flange connected to the rim of the upper end of the second plant-holding means and terminating downwardly in an inward horizontal flange, a vertical flange connected to the inward end of the horizontal flange having a threaded radially inward surface, and the interconnecting means comprises an annular ring lining having a threaded radially outward surface configured for cooperation with the threaded surfaces on the vertical flanges to enable selective connecting and disconnecting of the annular ring lining and the first and second plant-holding means.

21. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and wherein the upper joining means comprises an inwardly extending annular shelf connected to the inner surface of the side wall of the second plant-holding means adjacent the upper end, a vertical annular flange connected to the radially inward end of the annular shelf having a threaded radially outward surface, and the lower joining means comprises a side wall extension connected to the side wall of the first plant-holding means adjacent the lower end having a threaded inner surface configured for cooperation with the threaded surface on the upper joining means to enable selective connecting and disconnecting of the first and second plant-holding means.

22. The extendable planter apparatus of claim 21 wherein the annular shelf is provided with spaced openings to enable selective connecting and disconnecting of the end of a hanger to the shelf when the first and second plant-holding means are connected.

23. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and an opening in the lower end of the second plant-holding means, second lower joining means connected to the second plant-holding means adjacent the open lower end for joining the lower end of the second plant-holding means to base means, base means having base joining means for cooperating with the second lower joining means to enable selective connecting and disconnecting of the second plant-holding means and the base means wherein the second lower joining means comprises an annular bead connected to the second plant-holding means adjacent the lower end having a threaded radially outward surface, the base means comprises a flat bottom portion with radial dimensions corresponding to the radial dimensions of the second lower joining means, and the base joining means comprises a substantially upwardly extending outer side wall connected about the periphery of the flat bottom portion having a threaded radially inward surface configured for cooperation with the threaded surface on the second lower joining means to enable selective connecting and disconnecting of the second plant-holding means and the base means.

24. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and an opening in the lower end of the second plant-holding means, second lower joining means connected to the second plant-holding means adjacent the open lower end for joining the lower end of the second plant-holding means to base means, base means having base joining means for cooperating with the second lower joining means to enable selective connecting and disconnecting of the second plant-holding means and the base means wherein the second lower joining means comprises an upwardly and inwardly flaring annular flange connected to the rim of the lower end of the second plant-holding means terminating upwardly in an inward horizontal flange, a vertical flange connected to the inward end of the horizontal flange having a threaded radially inward surface, the base means comprises a flat bottom portion with radial dimensions greater than the radial dimensions of the second lower joining means, and a substantially upwardly extending outer side wall connected about the periphery of the flat bottom portion, and the base joining means comprises a vertical annular wall connected to the upper surface of the flat bottom portion inwardly of the outer wall having a threaded radially outward surface configured for cooperation with the threaded surface on the second lower joining means to enable selective connecting and disconnecting of the second plant-holding means and the base means.

25. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and an opening in the lower end of the second plant-holding means, second lower joining means connected to the second plant-holding means adjacent the open lower end for joining the lower end of the second plant-holding means to base means, base means having base joining means for cooperating with the second lower joining means to enable selective connecting and disconnecting of the second plant-holding means and the base means wherein the second lower joining means comprises a side wall extension connected to the second plant-holding means adjacent the lower end having a threaded inward surface, the base means comprises a flat bottom portion with radial dimensions greater than the radial dimensions of the second lower joining means, and a substantially upwardly extending outer side wall connected about the periphery of the flat bottom portion, and the base joining means comprises an annular ridge connected to the upper surface of the flat bottom portion of the base means inwardly of the outer side wall, a vertical annular wall connected to the upper surface of the annular ridge having threaded radially outward surface configured for cooperation with the threaded surface of the second lower joining means to enable selective connecting and disconnecting of the second plant-holding means and the base means, and wherein the annular ridge is further aligned with and contacts the lower rim of the second plant-holding means connected to the base means for spacing the lower rim a distance above the upper surface of the flat bottom portion of the base means thereby enabling excess water placed in the second plant-holding means to escape into and be contained by the base means.

26. The extendable planter apparatus of claim 25 wherein the annular ridge is provided with spaced openings to enable water contained by the base means to flow outwardly across the flat bottom portion of the base means to the upwardly extending outer side wall.

27. An extendable planter apparatus comprising first plant-holding means for holding roots of a plant, the first plant-holding means having sidewalls defining an interior downwardly widening cavity terminating at upper and lower open ends of the first plant-holding means, lower joining means connected to the first plant-holding means adjacent the lower open end for joining the lower end to second plant-holding means, second plant-holding means for holding roots of a plant, the second plant-holding means having sidewalls defining an interior downwardly widening cavity terminating at an open upper end and a lower end of the second plant-holding means, upper joining means connected to the second plant-holding means adjacent the upper open end for cooperating with the lower joining means to enable selective connecting and disconnecting of the first and second-plant-holding means, the open ends of the first and second plant-holding means providing a continuous downwardly widening cavity through the first and second plant-holding means when connected to accommodate the roots of a single plant, and wherein the first plant-holding means further comprises uniting means connected to the sidewall adjacent the lower end for selectively connecting and disconnecting the sidewall to tray means, tray means connected to the uniting means for supporting the sidewall having a base portion provided with an opening aligned with the lower open end, the lower joining means of the first plant-holding means connected to the tray means, and wherein the upper joining means of the second plant-holding means is detachably connected to the lower end of the first plant-holding means, the sidewalls of the first and second plant-holding means comprise continuour side walls formed about vertical axes, the tray means comprises a flat base portion, a substantially upwardly extending outer side wall connected about the periphery of the flat base portion, the uniting means comprises outwardly extending flanges connected to opposite portions of the side wall of the first plant-holding means and inwardly extending flanges connected to opposite portions of the side wall of the first plant-holding means and inwardly extending flanges connected to the outer side wall of the tray means vertically aligned with and adjacent to the outwardly extending flanges on the sidewall of the first plant-holding means for urging the flanges on the side wall toward the tray means when the side wall is connected to the tray means thereby enabling securing of the side wall to the tray means, the lower joining means comprises a vertical annular wall connected to the flat base portion of the tray means about the opening having a threaded radially outward surface, the upper joining means comprises a flat plate portion with radial dimensions corresponding to the radial dimensions of the upper open end of the second plant-holding means, friction means connected to the flat plate portion for selective friction engagement with the second plant-holding means adjacent the upper open end of the second plant-holding means, an opening in the flat plate portion aligned with the upper open end of the second plant-holding means and the opening in the flat base portion, an annular vertical wall connected to the flat plate portion about the opening having a threaded radially inward surface configured to cooperate with the threaded surface on the lower joining means to enable connecting and disconnecting of the first and second plantn-holding means.

28. The extendable planter apparatus of claim 27 further comprising second upper joining means connected to the first plant-holding means adjacent the upper open end for joining the upper end of the first plant-holding means to another plant-holding means, third plant-holding means for holding roots of a plant, the third plant-holding means having sidewalls defining an interior downwardly widening cavity terminating at upper and lower open ends of the third plant-holding means, third lower joining means connected to the third plant-holding means adjacent the lower open end for cooperating with the second upper joining means to enable selective connecting and disconnecting of the third plant-holding means and the first plant-holding means, the open ends of the plant-holding means providing a continuous downwardly widening cavity through the first, second and third plant-holding means when connected to accommodate the roots of a single plant.

29. The extendable planter apparatus of claim 27 wherein the first plant-holding means comprises a continuous side wall formed about a vertical axis having openings adjacent the lower rim of the side wall to enable excess water placed in the sidewall cavity to escape into and be contained by the tray means.

30. The extendable planter apparatus of claim 27 further comprising an opening in the lower end of the second plant-holding means, second uniting means connected to the sidewall of the second plant-holding means adjacent the lower end for selectively connecting and disconnecting the sidewall to second tray means, second tray means connected to the second uniting means for supporting the sidewall of the second plant-holding means having a base portion provided with an opening aligned with the opening in the lower end, second lower joining means connected to the lower end of the second tray means for joining the second plant-holding means to base cap means, base cap means for supporting the second plant-holding means, the base cap means having base cap joining means for cooperating with the second lower joining means to enable selective connecting and disconnecting of the second plant-holding means and the base cap means.

31. The extendable planter apparatus of claim 30 wherein the second tray means comprises a flat base portion, a substantially upwardly extending outer side wall connected about the periphery of the flat base portion, the second uniting means comprises outwardly extending flanges connected to opposite portions of the side wall of the second plant-holding means and inwardly extending flanges connected to the outer side wall of the second tray means vertically aligned with and adjacent to the outwardly extending flanges on the sidewall of the second plant-holding means for urging the flanges on the sidewall of the second plant-holding means toward the tray means when the sidewall of the second plant-holding means is connected to the second tray means thereby enabling securing of the sidewall of the second plant-holding means to the second tray means, the second lower joining means comprises a vertical annular wall connected to the flat base portion of the tray means about the opening having a threaded radially outward surface, the base cap means comprises a flat bottom portion having radial dimensions corresponding to radial dimensions of the second lower joining means, the base cap joining means comprises an annular vertical wall connected to the flat bottom portion of the base cap means having an inner surface threaded for cooperation with the threaded surface of the second lower joining means to enable selective connecting and disconnecting of the second plant-holding means and the base cap means.

* * * * *